(12) United States Patent
Markyvech

(10) Patent No.: US 6,539,820 B2
(45) Date of Patent: Apr. 1, 2003

(54) METHOD AND SYSTEM FOR TRANSMISSION UTILIZING CENTRIFUGAL CLUTCH TO OVERCOME TRANSMISSION TOOTH-BUTT

(75) Inventor: Ronald K. Markyvech, Allen Park, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/040,670

(22) Filed: Jan. 4, 2002

(65) Prior Publication Data

US 2002/0137596 A1 Sep. 26, 2002

Related U.S. Application Data

(63) Continuation-in-part of application No. 09/814,494, filed on Mar. 21, 2001.

(51) Int. Cl.⁷ .................. F16H 33/08; B60K 41/02
(52) U.S. Cl. .......................... 74/83; 477/176
(58) Field of Search .................. 74/337, 335, 473.21, 74/473.24, 473.25, 175, 176, 83

(56) References Cited

U.S. PATENT DOCUMENTS

| | | |
|---|---|---|
| 3,580,372 A | 5/1971 | Schiefer et al. |
| 3,696,901 A | 10/1972 | Henry |
| 3,810,533 A | 5/1974 | Densow |
| 4,081,065 A | 3/1978 | Smyth et al. |
| 4,361,060 A | 11/1982 | Smyth |
| 4,361,065 A | 11/1982 | Wilcox et al. |
| 4,576,263 A | 3/1986 | Lane et al. |
| 4,593,580 A | 6/1986 | Schulze |
| 4,595,986 A | 6/1986 | Daubenspeck et al. |
| 4,610,343 A | 9/1986 | Hikari |
| 4,646,891 A | 3/1987 | Braun |
| 4,648,290 A | 3/1987 | Dunkley |
| 4,754,665 A | 7/1988 | Vandervoort |
| 4,819,779 A | 4/1989 | Nickel |
| 4,821,590 A | 4/1989 | Tury |
| 4,850,236 A | 7/1989 | Braun |
| 4,899,609 A | 2/1990 | Nagata |
| 4,936,428 A | 6/1990 | Leigh-Monstevens |
| 5,099,711 A | 3/1992 | Langbo et al. |
| 5,281,902 A | 1/1994 | Edelen et al. |
| 5,335,566 A | 8/1994 | Genise |
| 5,370,013 A | 12/1994 | Reynolds et al. |
| 5,389,053 A * | 2/1995 | Steeby et al. .................. 74/335 |
| 5,409,432 A | 4/1995 | Steeby |
| 5,437,356 A | 8/1995 | Lohr |
| 5,439,428 A | 8/1995 | Slicker |
| 5,441,137 A | 8/1995 | Organek et al. |
| 5,481,170 A | 1/1996 | Edelen et al. |
| 5,490,063 A | 2/1996 | Genise |
| 5,509,867 A | 4/1996 | Genise |
| 5,582,558 A | 12/1996 | Palmeri et al. |
| 5,620,392 A | 4/1997 | Genise |
| 5,630,773 A * | 5/1997 | Slicker et al. .............. 477/176 |
| 5,634,867 A | 6/1997 | Mack |

(List continued on next page.)

*Primary Examiner*—Christopher P. Schwartz
*Assistant Examiner*—Melanie Torres
(74) *Attorney, Agent, or Firm*—Kevin M. Hinman

(57) ABSTRACT

A control system/method controls a vehicular automated transmission system so as to overcome a tooth butt condition. The automated transmission system including an internal combustion engine having an engine output member, a multiple speed change gear transmission having an input shaft, a centrifugal friction clutch for drivingly connecting said engine output member to said input shaft, a throttle responsive to manually requesting of a degree of engine fueling, and a system controller. The system controller varies the engine speed to encourage gear engagement upon sensing the tooth butt condition.

30 Claims, 10 Drawing Sheets

U.S. PATENT DOCUMENTS

| | | | |
|---|---|---|---|
| 5,681,242 A | * 10/1997 | Bates | 477/176 |
| 5,730,269 A | 3/1998 | Hersey | |
| 5,735,771 A | 4/1998 | Genise | |
| 5,775,639 A | 7/1998 | Fage | |
| 5,820,104 A | 10/1998 | Koyano et al. | |
| 5,901,823 A | 5/1999 | Nellums | |
| 5,947,847 A | 9/1999 | VanNimwegen et al. | |
| 5,960,916 A | 10/1999 | Organek et al. | |
| 5,974,354 A | 10/1999 | Janecke et al. | |
| 5,980,428 A | * 11/1999 | Liu | 477/175 |
| 6,015,366 A | 1/2000 | Markyvech et al. | |
| 6,022,295 A | 2/2000 | Lu | |
| 6,113,516 A | 9/2000 | Janecke | |
| 6,120,831 A | * 9/2000 | Zeller et al. | 426/594 |
| 6,126,570 A | 10/2000 | Bohm et al. | |
| 6,149,545 A | 11/2000 | Genise et al. | |

\* cited by examiner

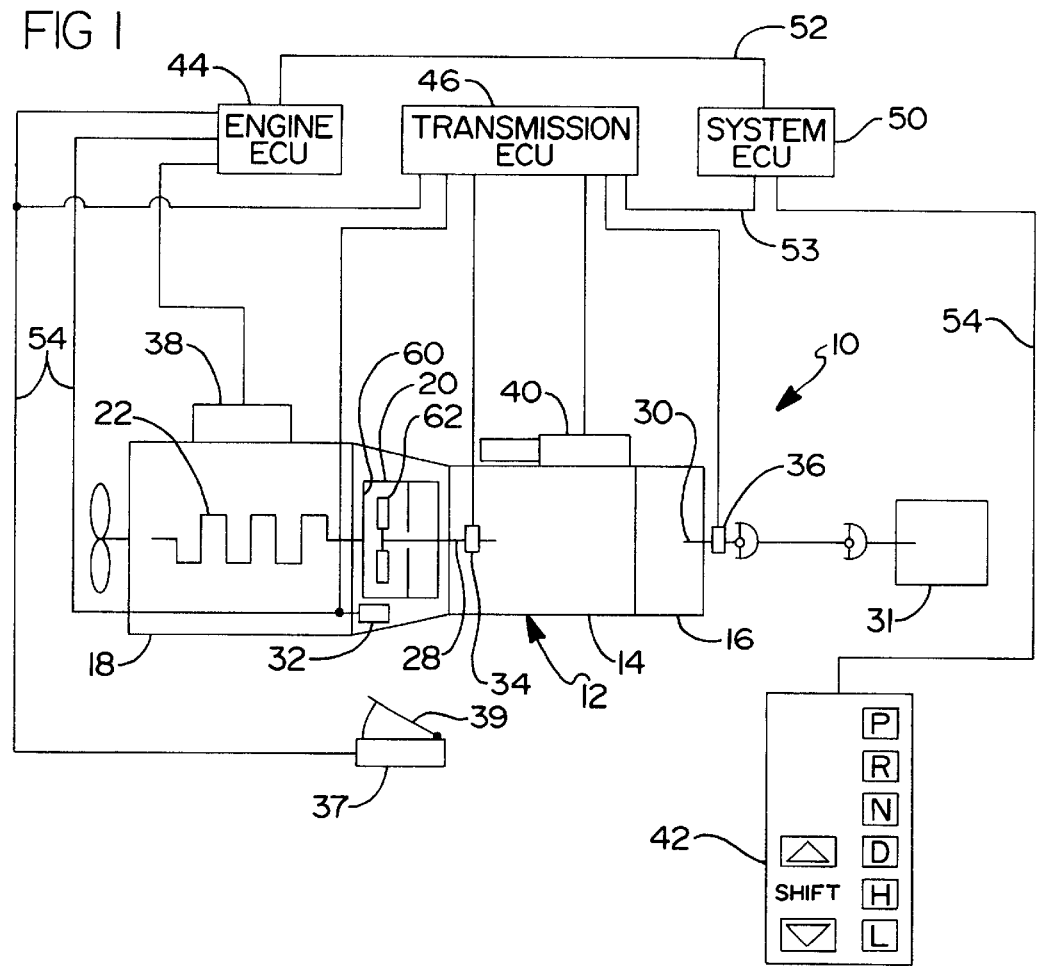
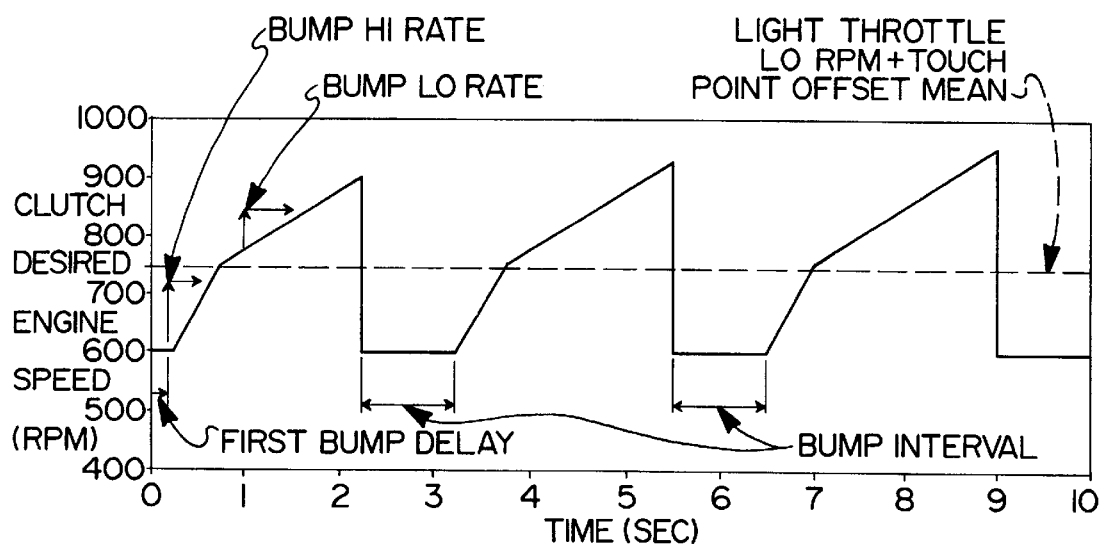

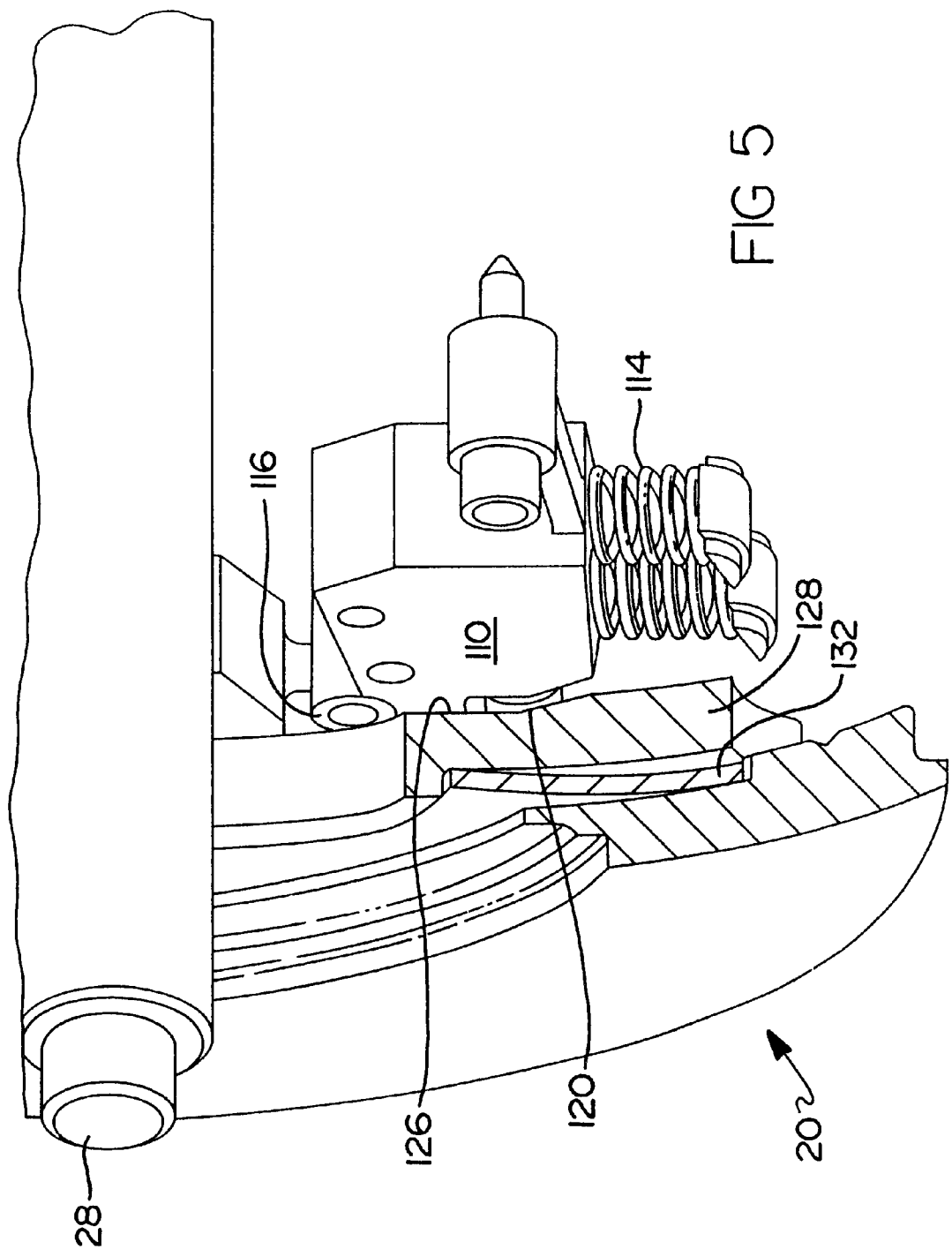

METHOD AND SYSTEM FOR TRANSMISSION UTILIZING CENTRIFUGAL CLUTCH TO OVERCOME TRANSMISSION TOOTH-BUTT

RELATED APPLICATIONS

This application claims priority to U.S. Ser. No. 09/814,494 filed Mar. 21, 2001 titled: CONTROL FOR TRANSMISSION SYSTEM UTILIZING CENTRIFUGAL CLUTCH, as a continuation-in-part of the same.

BACKGROUND OF THE INVENTION

1. Field of the Invention

The present invention relates to a centrifugal master clutch and a vehicular transmission system utilizing the same. In particular, the present invention relates to an automated vehicular transmission system comprising an engine, a multiple ratio transmission, a centrifugally operated master friction clutch for drivingly coupling the engine to the transmission and a controller for controlling fueling of the engine during vehicle launch conditions, as a function of throttle position and other sensed system operating conditions such as at least one of engine speed, transmission input shaft speed, transmission output shaft speed, engine torque and engaged gear ratio.

More particularly, an exemplary embodiment of the present invention relates to a start control method/system for a vehicular automated mechanical transmission system utilizing a centrifugal master friction clutch controlled solely by engine speed and a controller for controlling engine fueling during vehicle launch conditions.

2. Description of the Prior Art

Automated mechanical transmission systems not requiring the vehicle driver or operator to operate the vehicle master clutch (so called "two-pedal systems"), and clutch controls and actuators therefore, are known in the prior art as may be seen by reference to U.S. Pat. Nos.: 4,081,065; 4,361,060; 4,936,428; 5,439,428; 5,634,867; 5,630,773; 5,960,916 and; 5,947,847, the disclosures of which are incorporated herein by reference. These systems are not totally satisfactory as separate clutch actuators, sensors and/or, electrical and/or fluid power (i.e., compressed and/or hydraulic) connections thereto are required which adds to the expense of providing, assembling and maintaining such systems.

Centrifugally operated friction clutches are well known in the prior art and typically include a driving input member driven by a prime mover, usually an electric motor or internal combustion engine, and weights rotatable with the driving member which, upon rotation of the driving member, will move radially outwardly under the effect of centrifugal force to cause the driving input member to frictionally engage a driven output member. Examples of centrifugally operated clutches may be seen by reference to U.S. Pat. Nos.: 3,580,372; 3,696,901; 5,437,356; 3,810,533; 4,819,779; 5,441,137; 5,730,269; and; 4,610,343, the disclosures of which are incorporated herein by reference.

Fully or partially automated mechanical transmission systems that, upon determining that a dynamic shift from a currently engaged ratio into neutral and then into a target ratio is desirable, will, while maintaining the vehicle master friction clutch engaged, initiate automatic fuel control to cause reduced torque across the jaw clutches to be disengaged, are known in the prior art as may be seen by reference to U.S. Pat. Nos.: 4,850,236; 5,820,104; 5,582,558; 5,735,771; 5,775,639; 6,015,366; and 6,126,570, the disclosures of which are incorporated herein by reference. These systems include systems that attempt to fuel the engine to achieve a sustained zero driveline torque, and systems which force torque reversals, see U.S. Pat. No. : 4,850,236. These systems, upon sensing a neutral condition, will, while maintaining the master clutch engaged, cause the engine to rotate at a speed determined to cause synchronous conditions for engaging the target ratio.

Vehicular driveline systems, especially for heavy-duty vehicles, utilizing centrifugal clutches have not been satisfactory as the engines were typically controlled by throttle device position, not on a closed loop basis based upon a target engine speed and/or engine torque, and thus did not provide acceptable control for smooth vehicle launch and low speed operation. Prior art vehicular driveline systems utilizing centrifugal master clutches where not provided with clutches having damage and/or overheating protection and/or were not configured to lock up and release at engine speeds selected to permit dynamic shifting with the master clutch engaged.

Centrifugal clutches are engaged and disengage as a function of engine speed, requiring manipulation of engine speed to selectively engage and disengage the clutch. The need to manipulate the engine speed to achieve engagement and disengagement can make it difficult to overcome certain conditions, and in particular a tooth-butt condition. The tooth butt condition may occur when attempting to shift into gear with the vehicle stopped. The teeth of an engaging clutch sleeve hits or butts against the end of the intended receiving splines of the gear targeted for engagement. With no relative rotation between the parts, they remain butted against each other. With a conventional manually controlled master clutch, the master clutch would be momentarily engaged to spin up the input shaft and momentarily produce relative rotation between the sleeve and the target gear. With a centrifugal clutch, one lacks the ability to manually engage the master clutch to provide the desired relative rotation between the clutch sleeve and the gear.

SUMMARY OF INVENTION

In accordance with the present invention, the drawbacks of the prior art are reduced or minimized by the provision of a centrifugal master friction clutch, and a vehicular automated transmission system utilizing the same, which utilizes closed loop control to encourage engagement by using the controller to vary the engine speed.

A method for controlling a vehicular automated transmission system to overcome a tooth butt condition is disclosed herein. The automated transmission system includes an internal combustion engine having an engine output member, a multiple speed change gear transmission having an input shaft, a centrifugal friction clutch for drivingly connecting said engine output member to said input shaft, a throttle responsive to manually requesting of a degree of engine fueling, and a system controller. The system controller receives input signals including two or more of signals of (i) engine speed, (ii) throttle position, (iii) engaged transmission ratio, (iv) input shaft speed, (v) vehicle speed, (vi) a position of jaw clutch members, and (vii) shift signals indicative of attempting to shift the transmission into gear. The system controller has at least one mode of operation for selectively controlling engine fueling to control at least one of engine speed and engine torque. The system controller processes said signals according to logic rules to issue command output signals to system actuators including at least said engine controller. The method includes the steps of:

(a) sensing certain tooth butt constituent conditions;
(b) establishing the occurrence of the tooth butt condition based on the tooth butt constituent conditions;
c) imposing automatic control of the engine by the controller with the occurrence of the tooth butt condition;
d) at least periodically checking the tooth butt constituent conditions after the occurrence of the tooth butt condition and ending automatic control of the engine by the controller if any of the tooth butt constituent conditions are not satisfied;
e) automatically increasing the engine speed at a first ramp-rate under control of the controller until one of a first target engine speed and a first target elapsed ramp-up time is reached;
f) automatically decreasing the engine speed to an idle speed upon reaching one of the first target engine speed and the first target elapsed ramp-up time under control of the controller;
g) if the transmission remains in a tooth butt condition after reducing the engine speed to idle, again automatically increasing the engine speed under control of the controller at a second ramp-rate up to a maximum established by one of a second target engine speed and a second target elapsed ramp-up time;
h) automatically decreasing the engine speed to an idle speed upon reaching one of the second target engine speed and the second target elapsed ramp-up time under control of the controller; and
i) releasing automatic control of the engine by the controller.

A method for controlling a vehicular automated transmission system to overcome a tooth butt condition is disclosed herein. The automated transmission system includes an internal combustion engine having an engine output member, a multiple speed change gear transmission having an input shaft, a centrifugal friction clutch for drivingly connecting said engine output member to said input shaft, a throttle responsive to manually requesting of a degree of engine fueling, and a system controller. The system controller receives input signals including two or more of signals of (i) engine speed, (ii) throttle position, (iii) engage transmission ratio, (iv) input shaft speed, (v) vehicle speed, (vi) a position of jaw clutch members, and (vii) shift signals indicative of attempting to shift the transmission into gear. The system controller has at least one mode of operation for selectively controlling engine fueling to control at least one of engine speed and engine torque. The system controller processes said signals according to logic rules to issue command output signals to system actuators including at least said engine controller. The method includes the steps of:
 (a) sensing certain tooth butt constituent conditions;
 (b) establishing the occurrence of the tooth butt condition based on the tooth butt constituent conditions;
 c) transferring engine control to an anti-butt routine within the system controller with the occurrence of the tooth butt condition;
 d) at least periodically checking the tooth butt constituent conditions during execution of the anti-butt routine and exiting the anti-butt routine if any of the tooth-butt constituent conditions are not satisfied;
 e) automatically increasing the engine speed at a first ramp-rate under control of the anti-butt routine until one of a first target engine speed and a first target elapsed ramp-up time is reached;

f) automatically decreasing the engine speed to an idle speed upon reaching one of the first target engine speed and the first target elapsed ramp-up time under control of the anti-butt routine;
g) if the transmission remains in a tooth butt condition after reducing the engine speed to idle, again automatically increasing the engine speed under control of the anti-butt routine at a second ramp-rate up to a maximum established by one of a second target engine speed and a second target elapsed ramp-up time;
h) automatically decreasing the engine speed to an idle speed upon reaching one of the second target engine speed and the second target elapsed ramp-up time under control of the controller; and
i) releasing automatic control of the engine by the controller.

A control system for controlling a vehicular automated transmission system to overcome a tooth butt condition is disclosed herein. The automated transmission system includes an internal combustion engine having an engine output member, a multiple speed change gear transmission having an input shaft, a centrifugal friction clutch for drivingly connecting said engine output member to said input shaft, a throttle responsive to manually requesting of a degree of engine fueling, and a system controller. The system controller receives input signals including two or more of signals of (i) engine speed, (ii) throttle position, (iii) engaged transmission ratio, (iv) input shaft speed, (v) vehicle speed, (vi) a position of jaw clutch members, and (vii) shift signals indicative of attempting to shift the transmission into gear. The system controller has at least one mode of operation for selectively controlling engine fueling to control at least one of engine speed and engine torque. The system controller processes said signals according to logic rules to issue command output signals to system actuators including at least said engine controller. The control system includes logic steps effective for:
 a) sensing certain tooth butt constituent conditions;
 b) establishing the occurrence of the tooth butt condition based on the tooth butt constituent conditions;
 c) imposing automatic control of the engine by the controller with the occurrence of the tooth butt condition;
 d) at least periodically checking the tooth butt constituent conditions after the occurrence of the tooth butt condition and ending automatic control of the engine by the controller if any of the tooth butt constituent conditions are not satisfied;
 e) automatically increasing the engine speed at a first ramp-rate under control of the controller until one of a first target engine speed and a first target elapsed ramp-up time is reached;
 f) automatically decreasing the engine speed to an idle speed upon reaching one of the first target engine speed and the first target elapsed ramp-up time under control of the controller;
 g) if the transmission remains in a tooth butt condition after reducing the engine speed to idle, again automatically increasing the engine speed under control of the controller at a second ramp-rate up to a maximum established by one of a second target engine speed and a second target elapsed ramp-up time;
 h) automatically decreasing the engine speed to an idle speed upon reaching one of the second target engine speed and the second target elapsed ramp-up time under control of the controller; and i) releasing automatic control of the engine by the controller.

These and other objects and advantages of the present invention will become apparent from a reading of the following description of the preferred embodiment taken in connection with the attached drawings.

BRIEF DESCRIPTION OF THE DRAWINGS

FIG. 1 is a schematic illustration of a vehicular drivetrain using the centrifugal clutch and engine fuel control of the present invention.

FIG. 5 is a partial sectional view of the roller, ramp, and clamp force limiting spring mechanism utilized with the centrifugal mechanism.

FIG. 10 is a schematic illustration, in graphical format, of a plot of clutch desired engine speed as a function of time as established by the logic employed by the controller to overcome a tooth butt condition.

DESCRIPTION OF THE PREFERRED EMBODIMENT

Figure 2:
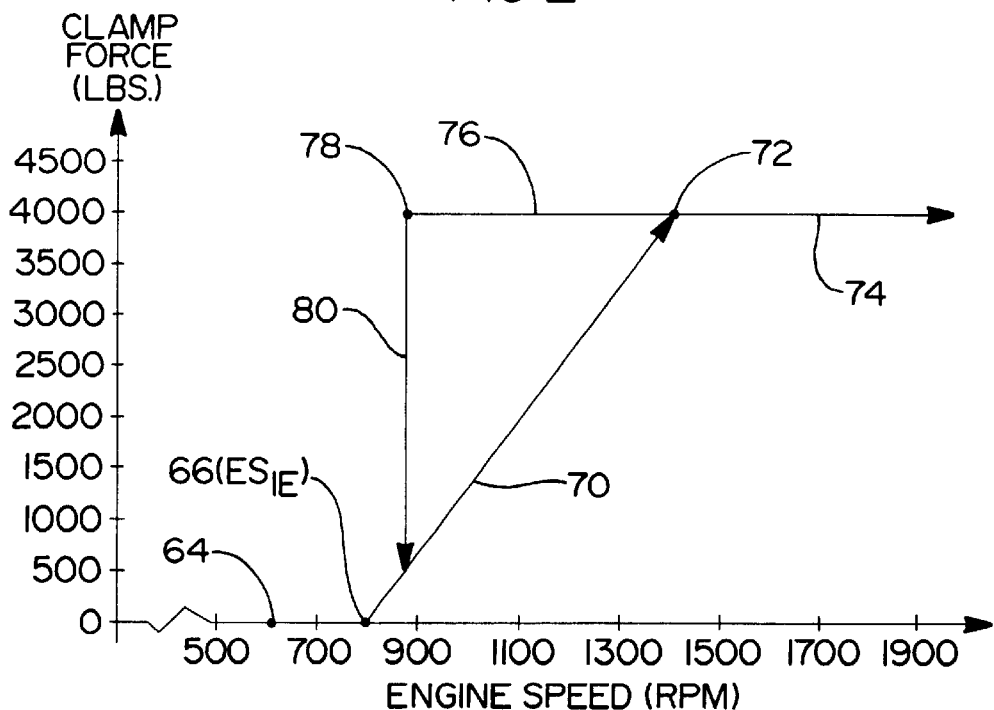
FIG. 2 is a schematic illustration, in graphical format, of the clamp force characteristics of the centrifugal clutch of the present invention at various engine speeds.

An at least partially automated vehicular drivetrain system 10 using the centrifugally operated friction master clutch and control of the present invention is schematically illustrated in FIG. 1. System 10 may be fully automated, as seen by way of example in U.S. Pat. No. : 4,361,060, partially automated, as seen by way of example in U.S. Pat. Nos.: 4,648,290 and 5,409,432, or manual with controller assist, as seen by way of example in U.S. Pat. Nos.: 4,850,236; 5,582,558; 5,735,771; and 6,015,366.

In system 10, a change-gear transmission 12 comprising a main transmission section 14 connected in series with a splitter-type auxiliary transmission section 16 is drivingly connected to an internal combustion engine 18, such as a well-known gasoline or diesel engine, by the centrifugal master friction clutch 20 of the present invention. Transmissions 12, by way of example, may be of the type well known in the prior art and sold by the assignee of this application, EATON CORPORATION, under the trademarks "Super-10" and "Lightning", and may be seen in greater detail by reference to U.S. Pat. Nos.: 4,754,665; 6,015,366; 5,370,013; 5,974,906; and 5,974,354, the disclosures of which are incorporated herein by reference. Such transmissions 12 may alternatively be without splitter-type auxiliary transmission section 16.

Engine 18 includes a crankshaft 22, which is attached to a driving member 60 of centrifugal master clutch 20, which frictionally engages with, and disengages from, a driven member 62, which is attached to the input shaft 28 of the transmission. A transmission output shaft 30 extends from the auxiliary transmission section 16 for driving connection to the vehicular drive wheels, as through a drive axle 31 or transfer case.

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As may be seen from FIG. 1, centrifugal clutch 20 requires no external clutch actuator and is operated as function of the measured rotational speed (ES) of the engine. Centrifugal clutch 20 also requires no connections to operating linkages, command signal inputs, power electronics and/or compressed air and/or hydraulic conduits. The most economical application of the present invention is with a dry clutch, however, the present invention is also applicable to wet clutch technology.

Transmission system 10 further includes rotational speed sensors 32 for sensing engine rotational speed (ES), 34 for sensing input shaft rotational speed (IS), and 36 for sensing output shaft rotational speed (OS), and providing signals indicative thereof. A sensor 37 provides a signal THL indicative of the position of throttle pedal 39 or of torque demand. The signal is commonly expressed as a percentage (0% to 100%) of full throttle position. Engine 18 is electronically controlled. In an exemplary embodiment, engine 18 includes an electronically responsive engine controller 38.

An X-Y shift actuator 40, which by way of example may be of the types illustrated in U.S. Pat. Nos.: 5,481,170; 5,281,902; 4,899,609; and 4,821,590, may be provided for automated or shift-by-wire shifting of the transmission main section and/or auxiliary section. One exemplary actuator has a pair of electrically operated motors or servos which shift the transmission through a mechanical interface. A shift selector 42 allows the vehicle driver to select a mode of operation and provides a signal $GR_T$ indicative of the gear ratio of the desired gear, or a Target Gear Ratio. The shift selector 42 shown in FIG. 1 has a plurality of gear range buttons which can be selected by the vehicle operator. Shift selector 42 could alternatively take other forms not illustrated, such as a shift lever having a shift knob. The lever could be toggled between positions corresponding to gear ranges.

Engine controller 38 and X-Y shift actuator 40 communicate through the system via an engine electronic control unit (ECU) 44 and a transmission ECU 46 and a system ECU 50. Engine ECU 44 and system ECU 50 communicate with each other over a first multiplexed data bus 52 employing an appropriate communications protocol such as SAE J-1922, SAE J-1939, ISO 11898 or the like. Transmission ECU 46 and system ECU 50 similarly communicate with each other over a second multiplexed data bus 53. It should be appreciated that the invention would operate equally well if one or more of ECUs 44, 46 and 50 were combined.

ECUs 44, 46 and 50 are preferably a microprocessor-based control unit of the type illustrated in U.S. Pat. Nos.: 4,595,986 and 4,361,065, the disclosures of which are incorporated herein by reference. ECUs 44, 46, 50 receive input signals from throttle position sensor 50, speed sensors 32, 34 and 36 over conventional electrical signal and power conducting elements 54 such as wires. ECUs 44, 46, 50 process such signals according to predetermined logic rules to issue command output signals to system actuators, such as engine controller 38, shift actuator 40, and the like over conducting elements 54. ECUs 44, 46, 50 may also direct each other to issue command signals. The communications protocol may establish a priority of such commands. The ECUs store control algorithms or programs for controlling the engine, the transmission and the clutch. Details of the clutch algorithm will be discussed later.

As is known, to disengage a jaw clutch in a vehicular mechanical transmission, especially in a heavy-duty vehicle, it is necessary to relieve torque lock at the engaged jaw clutch. If opening the master friction clutch 20 is not desirable, torque lock can be relieved by fueling the engine to cause assumed zero driveline torque and/or by forcing torque reversals, which will positively cause crossings of zero driveline torque.

Fully or partially automated mechanical transmission systems that, upon determining that a shift from a currently engaged ratio into neutral and then into a target ratio is desirable, will, while maintaining the vehicle master friction clutch engaged, initiate automatic fuel control to cause reduced torque across the jaw clutches to be disengaged, are also known in the prior art as may be seen by reference to above-mentioned U.S. Pat. Nos.: 4,850,236; 5,582,558; 5,735,771; 5,775,639; 6,015,366; and 6,126,570. Shifting with the master clutch remaining engaged is preferred in many situations, as such shifts tend to be of a higher shift quality and/or cause less wear on the driveline. These systems include systems that attempt to fuel the engine to achieve and maintain a zero driveline torque, see U.S. Pat. No. : 4,593,580, the disclosure of which is incorporated herein by reference, and systems that fuel the engine to force one or more torque reversals, see U.S. Pat. No. : 4,850,236. Upon sensing a transmission neutral condition, the clutch 20 is maintained engaged and the engine speed commanded to a substantially synchronous speed for engaging a desired or target gear ratio ($ES=OS \times GR_T$).

Control of engine torque to achieve a desired output or flywheel torque is known as and may be seen by reference U.S. Pat. No. 5,620,392, the disclosure of which is incorporated herein by reference. Engine torque as used herein refers to a value indicative of an engine torque, usually gross engine torque, from which an output or flywheel torque may be calculated or estimated. The relationship of gross engine torque to flywheel torque is discussed in U.S. Pat. Nos.: 5,509,867 and 5,490,063, the disclosures of which are incorporated herein by reference. An engine torque value may be estimated using a plurality of operating parameters including fuel flow rate, air flow rate, and air temperature.

By way of example, datalinks complying to the SAE J1939 or similar protocol, allow the ECU 50 to issue commands over the datalink for the engine to be fueled in any one of several modes, such as i) in accordance with the operators setting of the throttle, ii) to achieve a commanded or target engine speed ($ES = ES_T$), iii) to achieve a commanded or target engine torque ($ET = ET_T$) and iv) to maintain engine speed or engine torque below limits ($ES < ES_{MAX}$ and/or $ET < ET_{MAX}$). Many input/informational signals, such as engine speed (ES), engine torque (ET), and the like may also be carried by bus 52 and conducting elements 54.

The structure of the centrifugal clutch 20, best shown in FIGS. 4–7, will be described in greater detail below. Clutch 20 includes the input or driving member 60 fixed for rotation with engine crankshaft 22 (usually at the engine flywheel), and the output or driven member 62 fixed for rotation on transmission input shaft 28. As is known, rotation of the input member 60 will cause clutch 20 to engage and drivingly connect the engine output, usually an engine flywheel, or the like, to the transmission input shaft 28. The clamping force, and thus the torque transfer capacity of the clutch 20 is a function of rotational speed (ES) of engine 18 and clutch input member 60. The clutch 20 should reach incipient engagement at an engine speed slightly greater than engine idle. Clutch 20 should fully engage at an engine speed lower than the engine speed at which a first upshift is required. Unlike typical spring applied master friction clutches, which are normally engaged, clutch 20 is disengaged at lower engine speeds.

To allow proper vehicle launch and dynamic shifting with the master clutch 20 engaged, clutch 20, once fully engaged, should remain fully engaged at engine speeds greater than (i) the highest expected speed at which downshifts are initiated and (ii) the minimum expected engine speed after an upshift. Incipient engagement is the initial torque transfer contact of clutch friction surfaces as may be seen by reference to U.S. Pat. Nos.: 4,646,891 and 6,022,295, the disclosures of which are incorporated herein by reference. Logic for only initiating single or skip upshifts only if the expected engine speed at completion of the shift exceeds a minimum reference value may be seen by reference to U.S. Pat. Nos.: 6,113,516 and 6,149,545, the disclosures of which are incorporated herein by reference.

FIG. 2 is a graphical representation of the clamping force, of an exemplary embodiment the clutch 20, and thus the torque transfer capacity, at various engine speeds.

In the illustrated example, system 10 is a heavy duty truck driveline, engine 18 is an electronically controlled diesel engine having an idle speed of about 600 RPM to 700 RPM, point 64, and a governed top speed of about 1800 RPM to 2000 RPM. In the exemplary embodiment, the clutch 20 will move to incipient engagement at about 750 RPM, point 66 (ESIE), which is slightly above idle, and will have an increasing clamp load, line 70, as engine speed increases. The clutch will be most fully engaged at or below the capped maximum clamp force, 4000 pounds, at about 1400 RPM, point 72. Once at maximum clamp load, which is selected to lock up the clutch under extreme conditions (i.e., substantially zero slip at considerably greater than expected torque loads), the clutch 20 will remain locked up, lines 74 and 76, until engine speed falls to less than about 850 RPM to reach release point 78. At the release point 78, the clutch 20 will very rapidly disengage with decreasing engine speed, line 80, to prevent engine stalling.

850 RPM is below (i) the minimum engine speed at which downshifts will be commanded and (ii) the minimum expected engine speed at completion of an upshift at which an upshift, single or skip, will be initiated. See U.S. Pat. No. 6,149,545, the disclosure of which is incorporated herein by reference. Accordingly, a centrifugal clutch 20 having the performance characteristics indicated on FIG. 2 will allow a smooth modulated vehicle launch and will assure that the clutch remains engaged for dynamic upshifting and downshifting.

The structure of an exemplary embodiment of centrifugal clutch 20 may be seen by reference to FIGS.: 4, 5, 6A, 6B, and 7. Clutch 20 includes a clutch cover assembly 100, friction disc assembly 102, intermediate pressure plate 104, and friction disc assembly 106. As is well known from conventional clutches, cover assembly 100, a main pressure plate 130 and an intermediate pressure plate 104 mount to an engine flywheel 136 for rotation therewith and comprise the driving portion 60 of the clutch. Friction disc assemblies 102 and 106 are typically splined to transmission input shaft 28 and comprise the driven portion 62 of the clutch.

Figure 7:
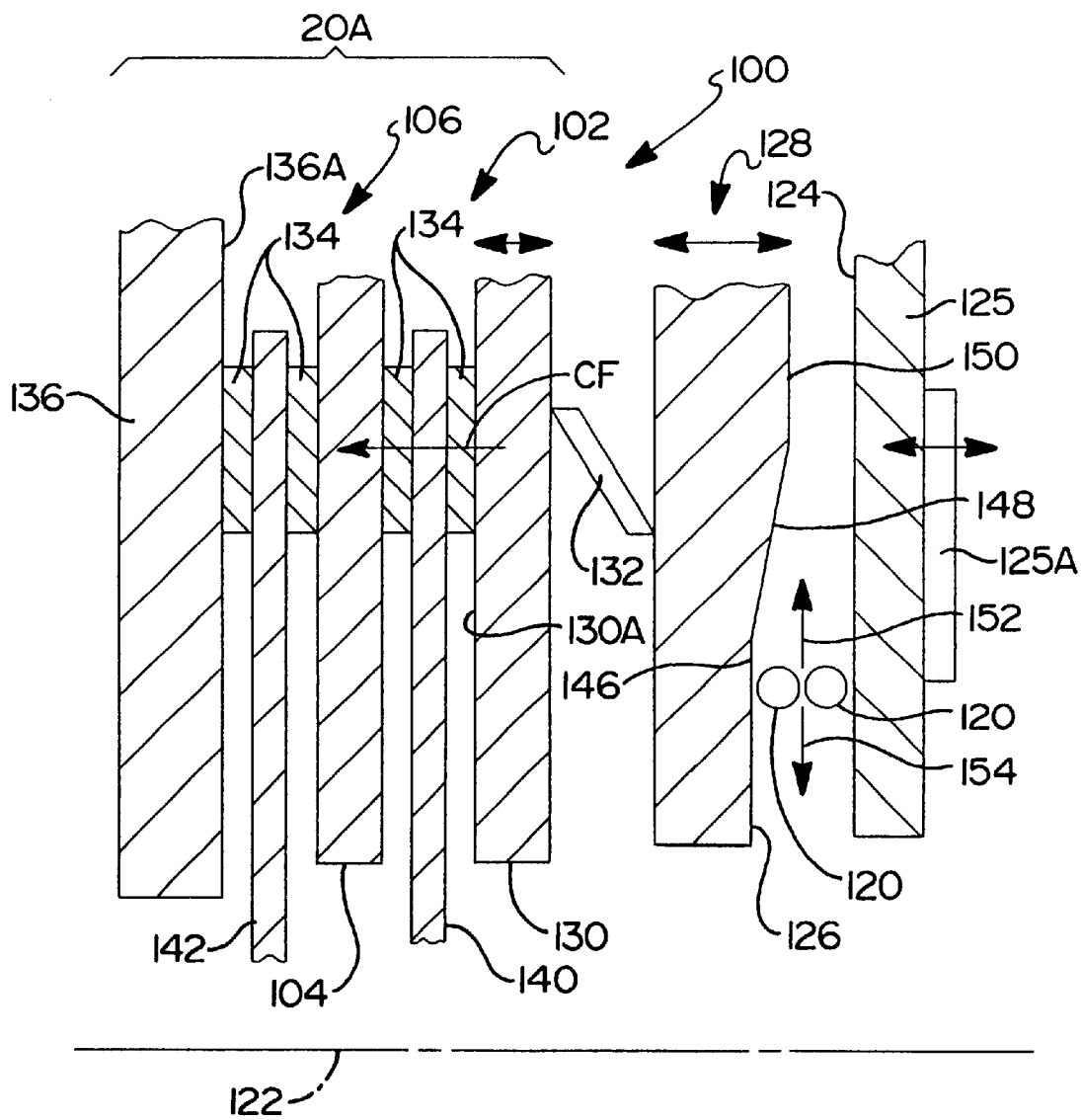
FIG. 7 is a schematic partial sectional view of the present invention.

Clutching portion 20A of clutch 20 is similar in structure and function to corresponding portions of existing dual plate clutches. Distinct from conventional dual plate clutches, however, cover assembly 100 includes four flyweights 110 pivotally attached to the cover assembly at pivot pins 112. Return springs 114 bias the flyweights 110 radially inwardly to rest on stops 116 (see FIG. 6A). A stop member 118 limits the radially outward movement of the flyweights (see FIG. 6B). As the engine and the cover assembly 100 rotate, the effect of centrifugal force will cause the flyweights 110 to move against the bias of springs 114 from the position of FIG. 6A to the position of FIG. 6B. The flyweights 110 each carry one or more rollers 120 or functionally similar wedging member, which will act between a reaction surface and a ramp to provide an axial clamping force for engaging the master friction clutch 20. FIG. 7 is a schematic illustration of the operational members acted upon by rollers 120. Employing two axially aligned rollers 120 is beneficial in that it substantially eliminates the axial reaction force of the flyweights at the pivot pins 112. The members of clutch 20 are shown in fragments in FIG. 7 as rotating about the rotational axis 122 of input shaft 28.

Rollers 120 are received between a substantially flat surface 124 of a fixed reaction plate 125 and a ramped surface 126 of an axially movable ramp plate 128. Alternatively, surface 124 could be ramped and/or the wedging member could be of a wedge configuration. Other wedging configurations may be utilized. The reaction plate 125 may be manually and/or automatically adjustable by an adjustment mechanism 125A to take up wear or the like. The ramp plate 128 acts on an axially movable main pressure plate 130 through a preloaded spring member 132, which will limit the axial force applied to the main pressure plate 130 by the ramp plate. Main pressure plate 130 will apply a clamping force CF on the friction pads 134 of the friction plates 102,106 which are trapped between surface 130A of the main pressure plate 130 and the intermediate pressure plate 104, and the intermediate pressure plate 104 and surface 136A of the engine flywheel 136. The hub portions 140 and 142 of the friction disc assemblies 102 and 106, respectively, are adapted to be splined to input shaft 28 for rotation therewith while plates 125, 128, 130, and 104 rotate with the engine flywheel 136.

At rest, one of the rollers 120 will engage the recessed portion 146 of surface 126 and will not apply a leftward axial clamping force to the friction pads. As the roller travels sufficiently radially outwardly and onto the ramped portion 148 of the ramp surface 126, an increasing axial clamping force is applied (see line 70 on FIG. 2). As the roller moves further radially outwardly onto the flat extended portion of 150 of surface 126, the clamp force will remain at a capped value (see lines 74 and 76 of FIG. 2) as limited by preload spring 132. The flyweights 110 will hit stops 118 prior to full compression of springs 132. Applying force through a spring to limit the maximum force applied is known in the prior art as may be seen by reference to U.S. Pat. No. 5,901,823.

A greater centrifugal force 152 is required to move rollers 120 up ramp portion 148 to flat portion 150 than is required to retain rollers 120 on the flat portion against the effect of spring force 154 from return springs 114. This accounts for the difference between the initial maximum clamp force engine speed value, point 72 on FIG. 2, and the release engine speed value, point 78 on FIG. 2. Back tapers and/or recesses may be added to surface 150 and or the inclination of ramp 148 and/or flat portion 150, the relative masses and/or the spring rate of spring 114 may be modified to change the engine speed of disengagement, point 78 on FIG. 2.

As is known, to launch a heavy duty vehicle, which will occur in a start ratio (i.e., at a relatively high ratio of input shaft speed to output shaft speed), less torque at the input shaft is required (for example, 600 to 900 lbs. ft., depending on grade) than that needed to move the vehicle at high speeds. Typical heavy-duty vehicle diesel engines will have a maximum torque output of about 1400 to 2200 lb.ft. at a maximum torque RPM.

For one embodiment of master friction clutch 20, 1000 lbs. of clamp force will provide a torque capacity of about 600 to 700 lbs. ft., while 4000 lbs. of clamp force will provide a torque capacity of about 3000 lbs. ft., which is well in excess of engine torque capacity and driveline capacity and provides a large margin of safety when the clutch is in the capped clamp load condition, lines 74 and 76 of FIG. 2.

At vehicle launch, i.e., when starting the vehicle from stop, the clutch 20 should lock up at between about 750 RPM and 950 RPM, the precise speed depending on factors such as whether the vehicle is starting up a steep grade. Lock-up will occur at a higher torque level on a steep grade. In the vehicle launch mode i.e., when the vehicle is stopped or is moving at very low vehicle speed, clutch 20 is not fully engaged and a start ratio is engaged (typically, Reverse, 1st, or 2nd in a 10 forward speed transmission). The control logic of the present invention will operate in a launch mode to be described later.

A clutch control algorithm is used to control the engagement of clutch 20. The clutch control algorithm helps facilitate vehicle launch and shifting. Although it is referred to as the clutch control algorithm, it interacts with the transmission algorithm and engine algorithm to control the engine in certain circumstances, as engagement of the clutch is primarily a function of engine speed. In such circumstances, the clutch algorithm may override the other algorithms, as well as driver inputs.

Generally, the clutch control algorithm actively controls the engine, and thereby controls clutch re-engagement, when either the clutch is disengaged, or the vehicle is not moving. One exception to this is when the parameter DRIVER SELECTION=NEUTRAL, that is, if the driver selects Neutral as the gear range. When Neutral is selected, the system 10 releases the engine of control by the clutch algorithm, as the engagement or disengagement of clutch 20 is of no consequence. However, an exception to this exception occurs when input shaft rotation is not detected on initial system power-up. On initial power-up, Neutral is always the selected gear range. If input shaft rotation is not detected, that is if INPUT SHAFT SPEED (IS)<100 RPM, then the clutch algorithm shall request an increase in engine speed in the same manner employed below in the Anti-Butt Control Routine. The system will continue to increase the ENGINE SPEED (ES) until the INPUT OVER MINIMUM parameter (a status message indicating whether the input shaft speed (IS) has exceeded 100 RPM) equals TRUE. This is done to help establish the engine speed (ES) at which clutch engagement is initiated, and to ensure that the input rotational speed sensor 34 is functional.

When starting or launching a vehicle from a stop, it is necessary to place the transmission into a drive gear range and engage one of the jaw clutches. However, it should be appreciated that, in a vehicle-stopped condition, engaging a jaw clutch in a transmission 12 employing centrifugal clutch 20 may require limiting the engine's speed to ensure clutch 20 is disengaged. This is particularly true when the engine control system is operating the engine 18 at an elevated speed responsive to a condition such as cold start-up.

Figure 8:
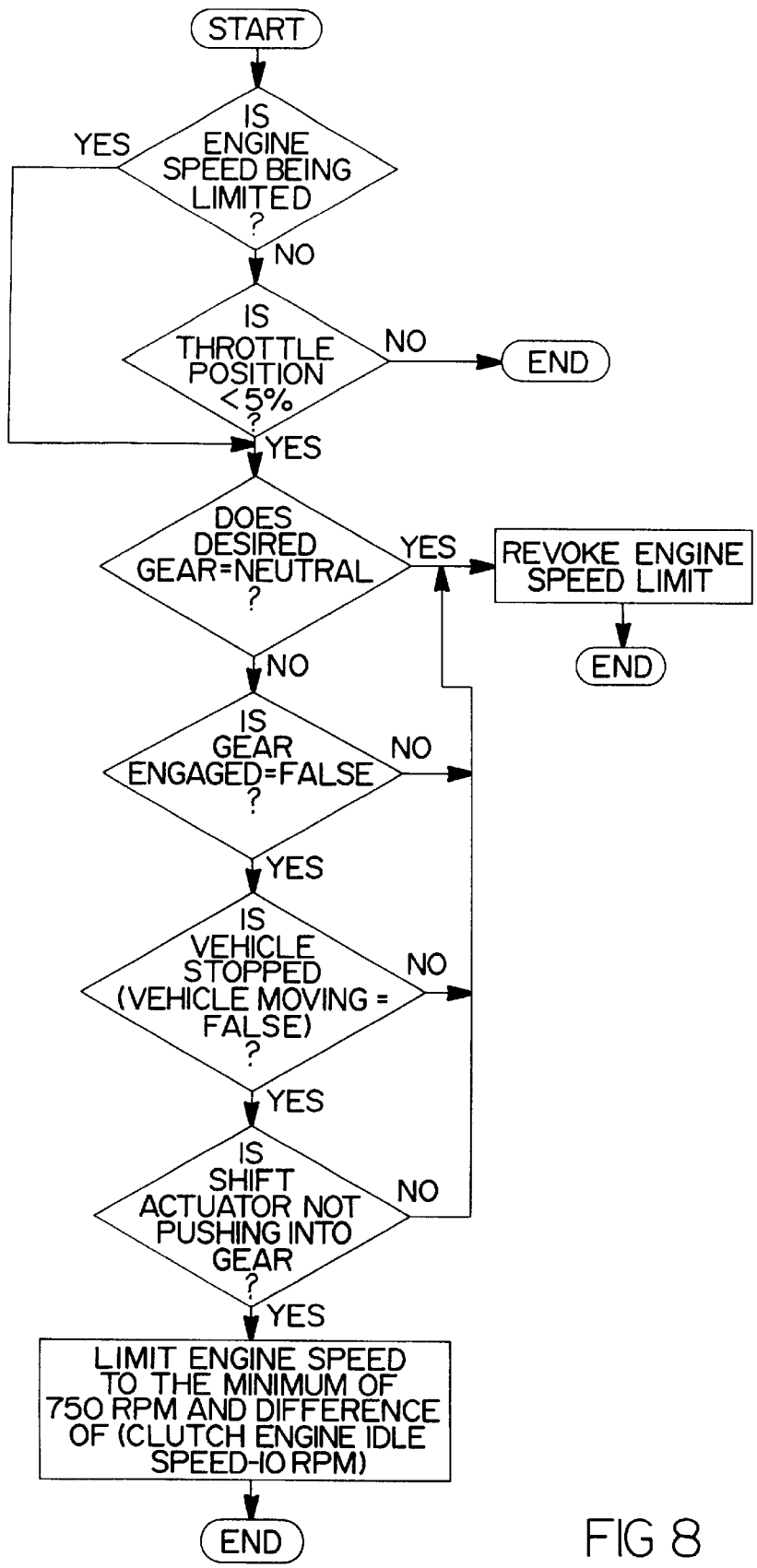
FIG. 8 is a schematic illustration, in flowchart format, of the logic employed by the controller to establish whether or not it is appropriate to limit engine speed to prevent clutch engagement.

If shifting into gear is attempted in a vehicle-stop condition, the engine speed must be below that at which clutch 20 begins to engage to ensure that the input shaft and the jaw clutches are able to stop rotating. The clutch algorithm, in accord with the exemplary logic illustrated in the flow chart of FIG. 8, limits the engine speed if the following conditions are present:

i) DESIRED GEAR≠NEUTRAL (the gear select lever is not in the "Neutral" position); AND ii) GEAR ENGAGED=FALSE (a gear is not indicated as being engaged); AND iii) VEHICLE MOVING=VEHICLE NOT MOVING; AND iv) pedal 39 is in or was recently in a position less than a predetermined pedal position indicative of the range of throttle position for which an idle condition is presumed (e.g., 5% throttle); AND v) CONTROL SHIFT STATE ≠PUSHING TO GEAR (the X-Y shift actuator 40 is not pushing the transmission into a gear).

The engine speed limit in such a condition is the lesser of a predetermined maximum engine speed for a non-neutral condition (750 RPM in an exemplary embodiment), and an engine speed limit target for an off-throttle non-neutral gear range and clutch disengaged mode (or more simply CLUTCH ENGINE IDLE SPEED) less a predetermined engine idle offset speed (10 RPM in an exemplary embodiment).

Once it has been determined that limiting the engine speed is appropriate, the pedal position parameter is ignored, so that even if the pedal position is increased by the vehicle operator to beyond the predetermined limit, the engine speed is limited to the lower speed necessary to place the clutch in a released condition and thereby permit gear engagement. However, if any one of the other parameters changes, such as the transmission being placed in Neutral, or a gear becoming engaged, or the vehicle beginning to move, or the X-Y shift actuator 40 pushing the transmission into a gear, then the engine speed limit is no longer needed and is therefore revoked.

If the transmission 12 cannot be shifted into gear in a stopped condition, it may be because of gear or tooth butting. When attempting gear engagement with the vehicle stopped, the teeth of the engaging clutch sleeve may hit or butt against the flat on the end of the intended receiving splines of the gear targeted for engagement. This condition is known as tooth butt, and is due to the relatively tight clearance between the engaging teeth needed to minimize lash between the mating parts, and to the shape of the facing ends of the teeth. Generally, there is enough relative rotation between the engaging members that the clutch sleeve continue to rotate off the tooth butt condition to permit engagement. However, in some circumstances, and in particular when the vehicle is at a complete stop, there may be no rotational speed difference between the parts. Lack of relative rotation may result in the sleeve remaining in a butted condition and the shifter 40 being unable to engage the desired gear. With a conventional manually selectable master clutch, such a situation can be overcome by momentarily engaging the master clutch to induce rotation of the input shaft and the elements rotatively coupled thereto. However, with a centrifugally operated master clutch, one cannot simply start to engage the clutch, as one does not have precise control over clutch engagement, as engagement varies with engine speed.

Figure 9A:
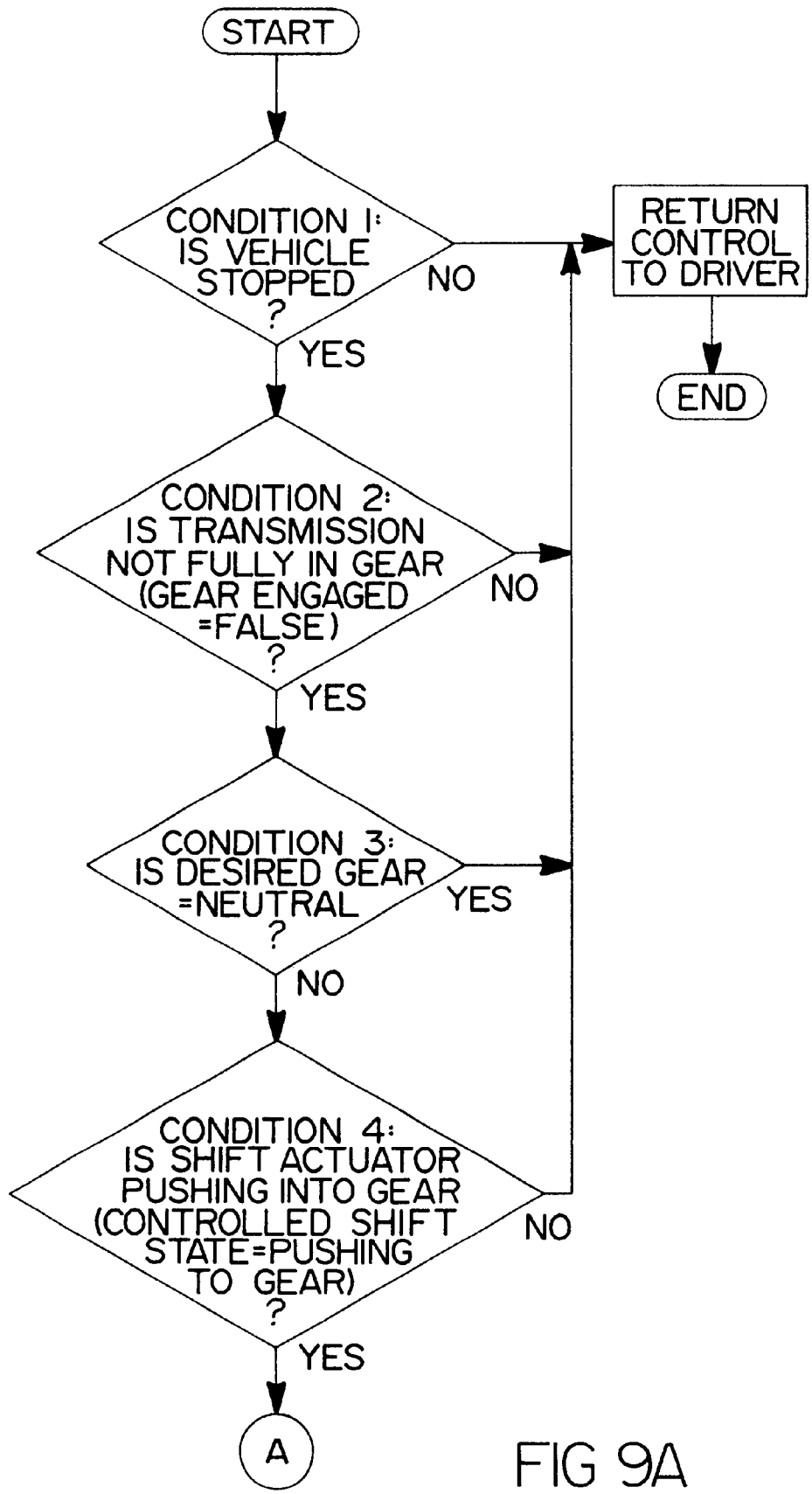
FIGS. 9A, 9B and 9C are schematic illustrations, in flowchart format, of the logic employed by the controller to identify and overcome a tooth butt condition.
Figure 9B:
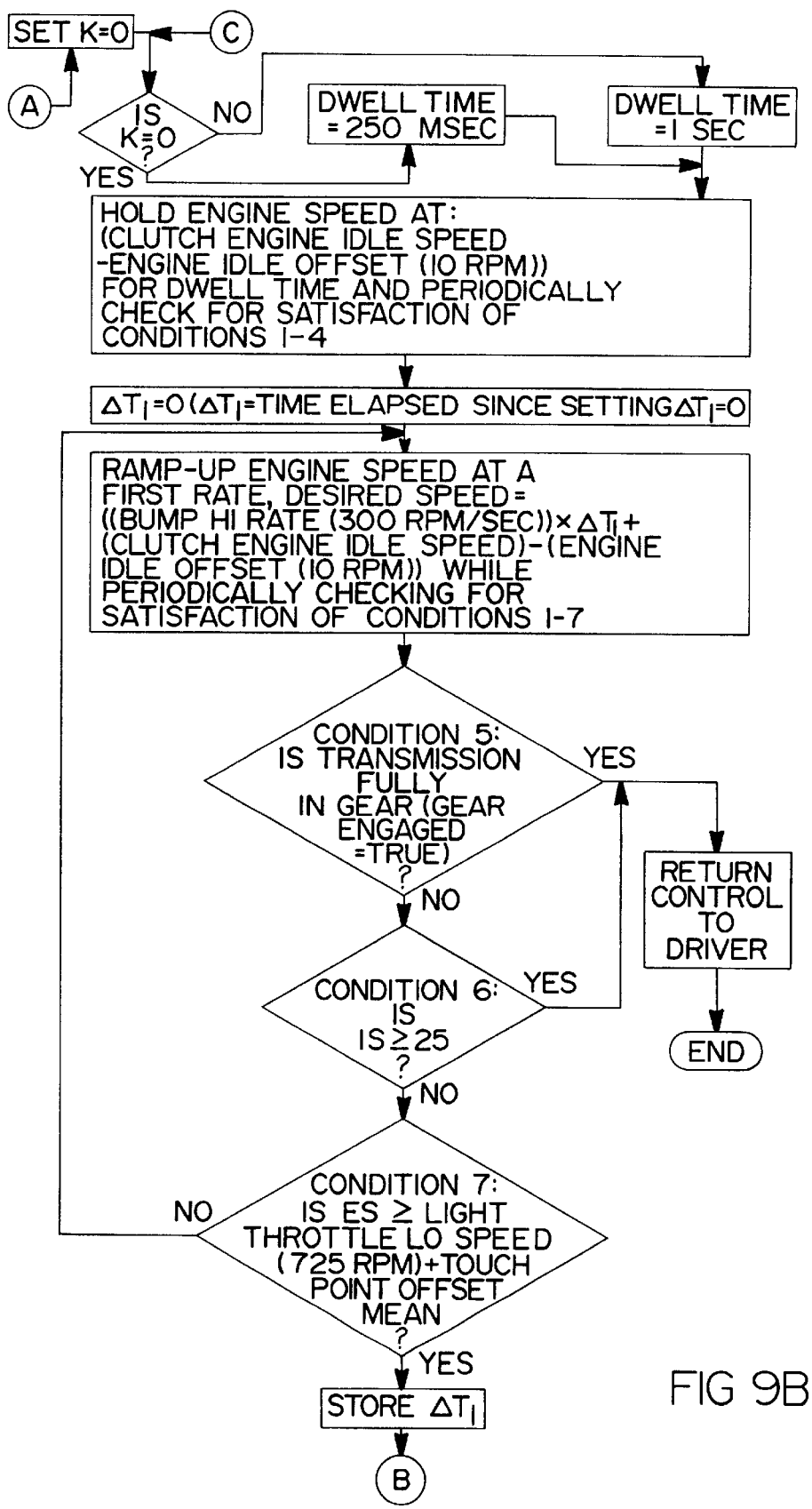
Figure 9C:
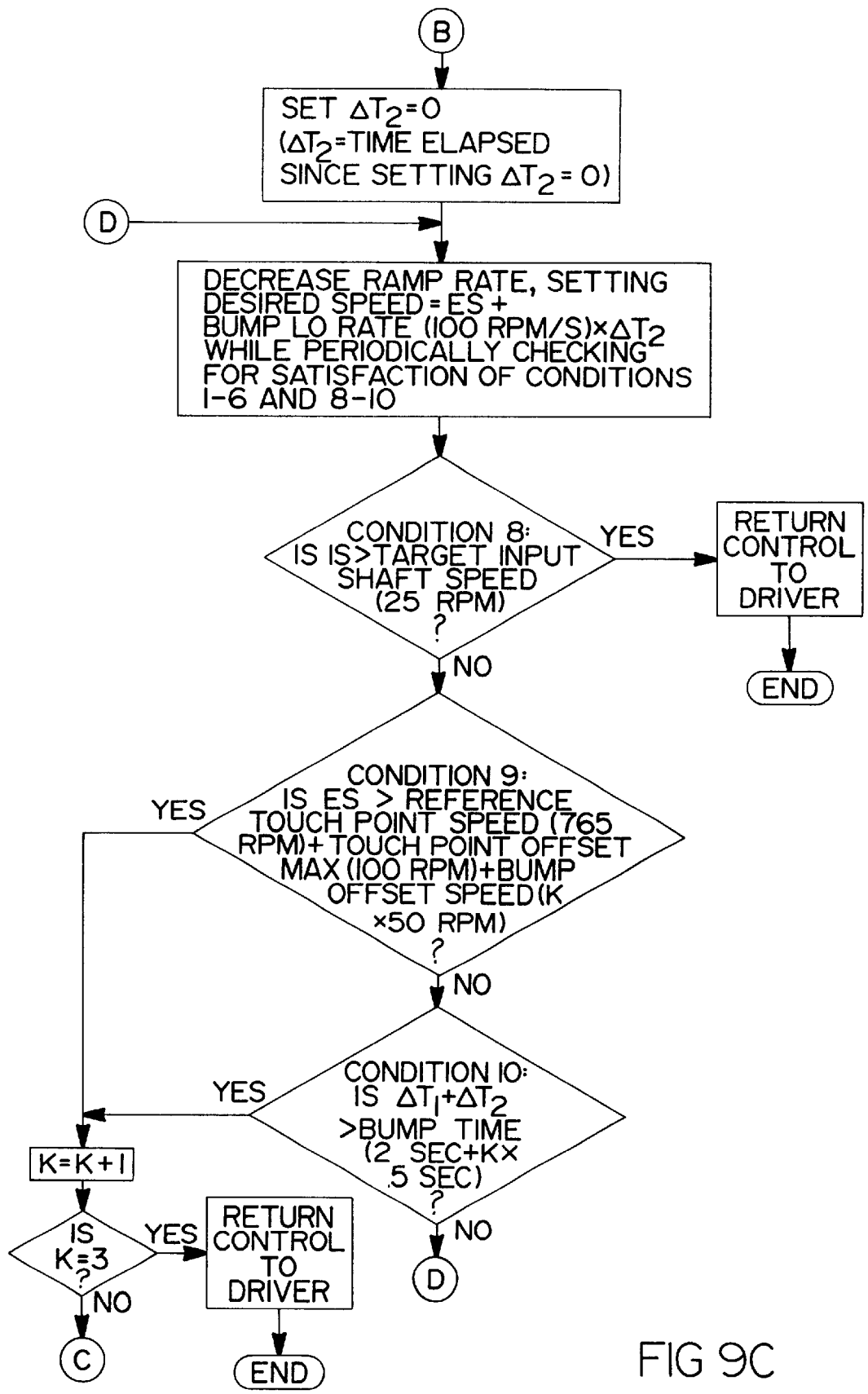

Once the X-Y shift actuator 40 begins pushing towards gear engagement, the system 10, through its sensors and control units, monitors engagement to determine if transmission 12 needs assistance to overcome a tooth butt. Once the transmission 12 has engaged, the system performs a normal vehicle start-from-rest launch. The flowcharts of FIGS. 9a, 9b and 9c illustrate an exemplary embodiment of the logic of an anti-butt routine used to identify and overcome a tooth butt.

The anti-butt routine within the clutch control algorithm assumes control of the engine to increase the engine speed ES in a controlled fashion. Such control is implemented when certain below identified tooth butt conditions are satisfied:

i) the vehicle is not moving (Condition 1); and ii) a gear is not indicated as being engaged (Condition 2); and iii) the desired gear is not Neutral (Condition 3); and iv) the X-Y shift actuator 40 is pushing into a gear position (Condition 4).

If the above conditions are all satisfied, then the anti-butt routine of the clutch control algorithm commands the engine to increase in rotational speed as shown in FIG. 10. Up to three engine-speed-increase cycles or bumps are used in an attempt to provide engagement. The anti-butt routine is terminated when the GEAR ENGAGED indicator (within the ECU 50) evidences that there is engagement (Condition 5), or that the INPUT SHAFT SPEED (IS) is >=25 RPM (Condition 6). If the three engine-speed-increase cycles are completed without the gear becoming engaged, throttle control will be returned to the driver. The driver will have the opportunity to manually encourage gear engagement by modulating the throttle pedal. When the selected starting gear is changed or the desired gear is changed to Neutral and back into a gear, the cycle routine shall be reset and shall activate again if needed to engage the starting gear.

Once the starting conditions for the anti-butt control routine are met, the first engine-speed-increase cycle begins after a predetermined delay entitled "FIRST BUMP DELAY." The FIRST BUMP DELAY is for approximately 0.25 seconds and provides time for a clean engagement of clutch 20 before the first speed ramp starts. The engine speed, in accord with the plot of the "CLUTCH DESIRED ENGINE SPEED" of FIG. 10, is ramped up from its initial value (equal to the CLUTCH ENGINE IDLE SPEED minus the ENGINE IDLE OFFSET, with ENGINE IDLE OFFSET equal to 10 RPM in an exemplary embodiment) at a BUMP HI-RATE until it exceeds a target value (LIGHT THROTTLE-LO SPEED 160+TOUCH POINT OFFSET MEAN (as set forth below in the discussion of the Vehicle-Start-From-Rest Routine and FIG. 3))(Condition 7), then increases at a slower BUMP LO-RATE. The BUMP Hi-RATE is approximately 300 RPM/sec. The BUMP LO-RATE is approximately 100 RPM/sec. The speed ramp-up is stopped once either INPUT SHAFT SPEED (IS) >TARGET INPUT SPEED (Condition 8), MEASURED ENGINE SPEED (ES)>(REFERENCE TOUCH POINT SPEED+TOUCH POINT OFFSET MAX (equal to 100 RPM in an exemplary embodiment)+BUMP OFFSET SPEED)(Condition 9), or a timer exceeds the cycle time (Condition 10). If engagement does not occur on the first cycle, subsequent bumps increase the measured engine speed limit and the timer limit to more aggressively encourage engagement. Between bumps, a BUMP INTERVAL delay time of approximately one second is allowed for engagement to occur. As noted above, if engagement is not achieved after the third bump, engine speed control is returned to the driver. When engine speed control is returned to the driver, the fueling system responds to driver throttle pedal inputs. This can be achieved directly through a cable system (not shown) or less directly, with a drive-by-wire system employing electrical signals from throttle position sensor 37 to control fueling.

When throttle control is returned to the vehicle driver before centrifugal clutch 20 is engaged, then care must be taken to prevent the driver from abruptly engaging the clutch 20. To prevent such abrupt engagements, the clutch control algorithm will ramp up the engine speed limit at a moderate rate proportional to throttle position instead of instantly returning to full throttle.

If the measured THROTTLE PEDAL POSITION is less than a predetermined CLUTCH PEDAL IDLE value, equal to 5% in an exemplary embodiment, then the clutch algorithm will limit the speed or torque of the engine to just below idle. The speed is preferably limited to the minimum of MAX ENGINE IDLE SPEED (equal to 750 RPM in an exemplary embodiment) and the earlier described initial value of the CLUTCH DESIRED ENGINE SPEED (CLUTCH ENGINE IDLE SPEED minus ENGINE IDLE OFFSET).

As the driver applies more throttle, the engine speed limit is ramped up at a rate of NORMAL CONTROLLED RAMPED SPEED (equal to 200 RPM/Sec in an exemplary embodiment), or at a rate of RTD (Ride Through Detent) CONTROLLED RAMP SPEED (equal to 250 RPM/Sec in an exemplary embodiment) if the MEASURED (throttle) PEDAL POSITION is greater than CLUTCH PEDAL RTD (equal to 90% throttle in an exemplary embodiment). The ramping continues until either:
i) the engagement conditions change, such as
   a) GEAR ENGAGED=TRUE or
   b) CONTROL SHIFT STATE≠PUSH TO GEAR or
   c) VEHICLE MOVING≠VEHICLE NOT MOVING OR
ii) MEASURED ENGINE SPEED (ES)<CLUTCH DESIRED ENGINE SPEED minus CLUTCH OFFSET MARGIN (25 RPM in an exemplary embodiment) OR
iii) CLUTCH DESIRED ENGINE SPEED=J1939 ENGINE CONFIG. MAP SPEED [6] (equal, in an exemplary embodiment, to an ENGINE HIGH IDLE SPEED (Governor+Droop) established by the J1939 protocol).

If the engagement conditions change, the system reacts by selecting an appropriate next routine, such as a Vehicle-Start-From-Rest Routine as described below. If the MEASURED ENGINE SPEED (ES) does not keep up with the limit, the CLUTCH DESIRED ENGINE SPEED is set equal to MEASURED ENGINE SPEED+CLUTCH OFFSET MARGIN (25 RPM in an exemplary embodiment) before continuing the ramp up to prevent allowing too wide a zone where uncontrolled acceleration can occur. It should be appreciated that when the MEASURED ENGINE SPEED (ES) fails to keep up with the limit as the limit is decreasing, the CLUTCH DESIRED ENGINE SPEED is set equal to the MEASURED ENGINE SPEED+CLUTCH ONSET MARGIN to avoid uncontrolled deceleration. If the CLUTCH DESIRED ENGINE SPEED limit reaches the J1939 ENGINE CONFIG. MAP SPEED, it is held without ramping further. This allows the driver manual throttle control flexibility without completely removing automatic control.

A Vehicle-Start-From-Rest Routine, or Vehicle Launch Routine, is now described. As is characteristic of a centrifugal clutch, clutch 20 provides increasing clamp force and torque transmission capacity as engine speed increases. It is therefore important to control the rate at which engine speed increases to control the application of the clamping force. When such control is exerted by the Clutch Control Algorithm, in a system employing the J1939 protocol, a J1939 "speed/torque limit" command is issued and is given the highest priority within the hierarchy of commands. When the throttle is applied, an engine speed target is determined for that throttle setting. The engine speed is ramped up from idle speed to this engine speed (a CLUTCH TARGET SPEED) at a controlled rate to prevent increasing clutch torque at a rate faster than the natural frequency of the driveline.

Figure 3:
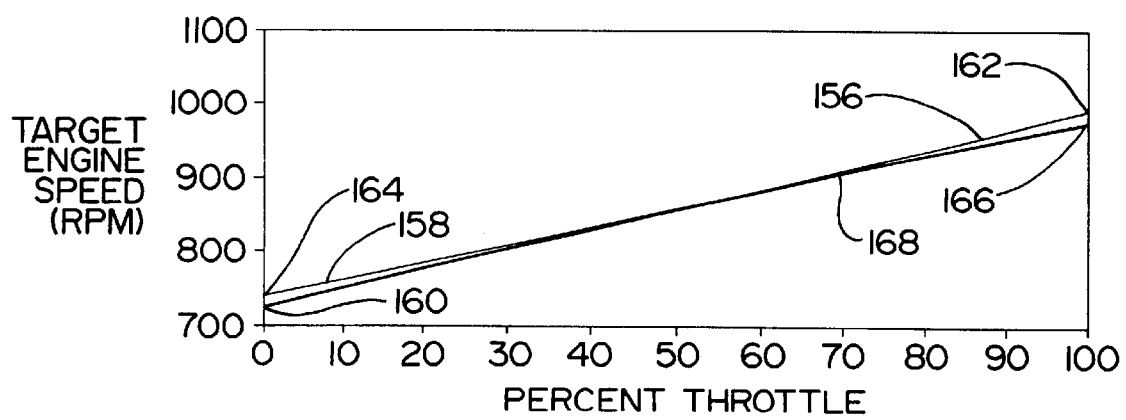
FIG. 3 is a schematic illustration, in graphical format, of target engine speeds for various throttle positions at vehicle launch for the system of the present invention.
Figure 4:
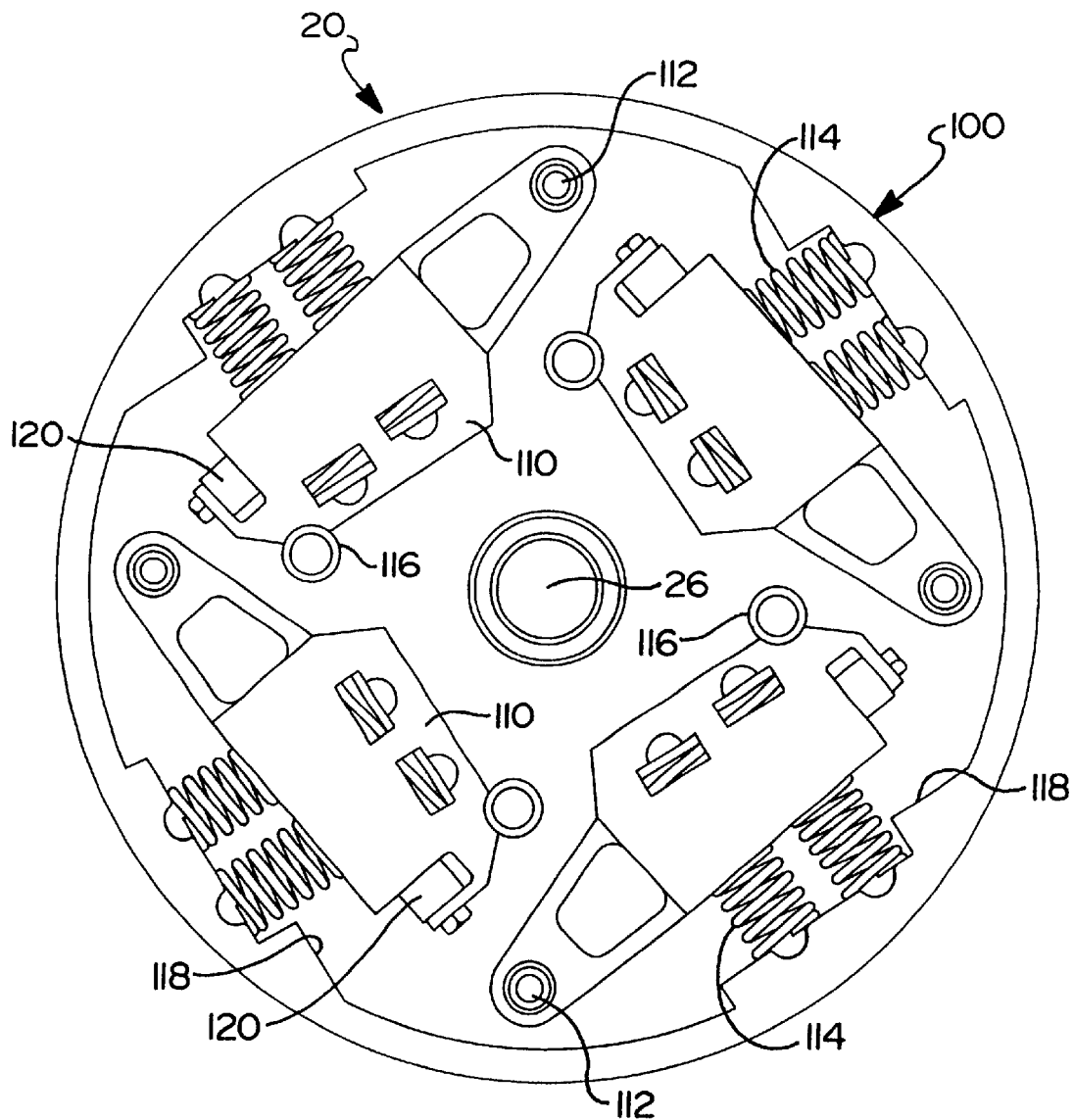
FIG. 4 is a partial top view, in section, of the cover and centrifugal mechanism of the clutch of the present invention.
Figure 6A:
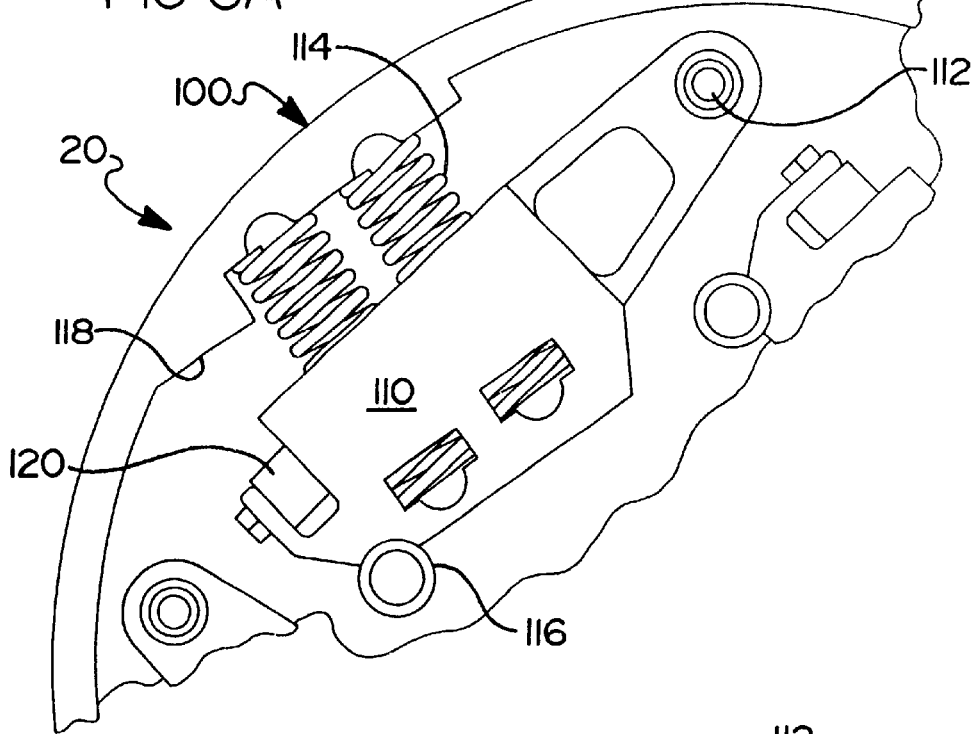
FIGS. 6A and 6B are partial sectional views illustrating the position of the flyweights in the fully radially inward clutch disengaged position and the fully radially outward clutch fully engaged position, respectively.
Figure 6B:
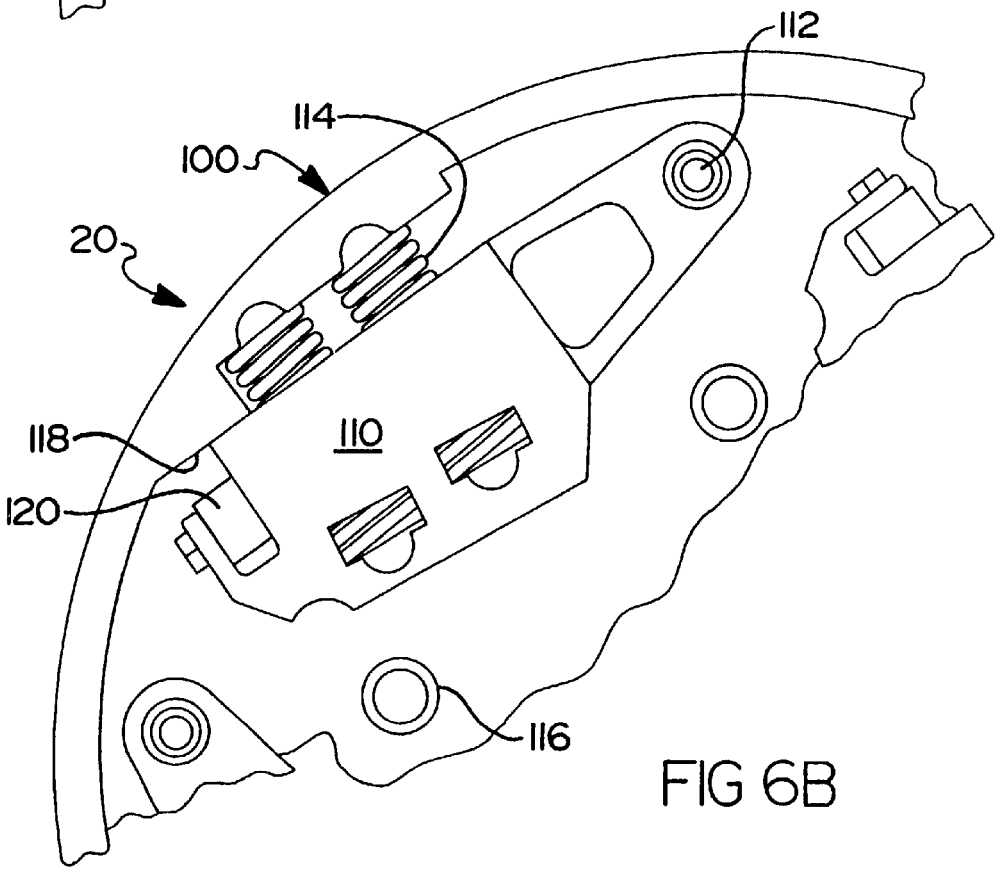

FIG. 3 has two intersecting lines, a Light Throttle Target Line 156, and a Heavy Throttle Target Line 158, showing target engine speeds across the full range of throttle positions, from zero percent to 100 percent throttle. The four end points of these two lines (percent throttle equals zero and 100) are established experimentally and are named: Light Throttle-Lo Speed 160; Light Throttle-High Speed 162; Heavy Throttle-Lo Speed 164; and Heavy Throttle-High Speed 166, 725 RPM, 990 RPM, 740 RPM, and 975 RPM respectively in an exemplary embodiment. A Clutch Target Speed 168 is defined by the lower of the two lines for a given throttle position. The Clutch Target Speed line 168 is drawn with a heavier line to distinguish it.

As shown in FIG. 3, the Clutch Target Speed 168 is a function of throttle position. For example, at 20% throttle, the Clutch Target Speed 168 would be 778 RPM. For 100% throttle, the target would be 975 RPM. Employing two lines 156 and 158 to define a dual-slope CLUTCH TARGET SPEED 168 provides a more appropriately tuned clutch algorithm. During the development of the algorithm, it was found that the dual-slope relationship was superior to a single slope line. Although the slightly steeper Light Throttle Target Line 156 is not far removed from the Heavy Throttle Target Line 158, the difference is sufficient to make a perceptible difference in the throttle response. The vehicle felt more responsive when a dual-slope line 168 was employed. Conversely, with a single slope line, the vehicle felt more sluggish at light throttle angle starts.

Before the normal Vehicle-Start-From-Rest routine is initiated, the following conditions must be satisfied: the throttle pedal position must be greater than a predetermined throttle position taken to be indicative of the driver not pressing the throttle (5% throttle in the exemplary embodiment); the desired gear as determined by the control algorithm is not neutral (the gear select lever is not in the neutral range); a drive gear is engaged; and the clutch is disengaged.

The routine increases the engine speed at a controlled rate to reach the speed limit established by the CLUTCH TARGET SPEED 168. The CLUTCH TARGET SPEED 168 is merely a limit and does not force the engine to run at a speed higher than that which the throttle setting demands. This limit is communicated via J1939 commands. The CLUTCH DESIRED ENGINE SPEED is an engine speed control parameter defined by a Vehicle-Start-From-Rest routine. The CLUTCH DESIRED ENGINE SPEED moves from an initial point equal to a CLUTCH ENGINE IDLE SPEED (the engine speed limit target throttle position equal to 0% in a non-neutral gear position, and the clutch disengaged) less an ENGINE IDLE OFFSET (equal to 10 RPM in the exemplary embodiment), to an intermediate speed equal to the Light Throttle Lo Speed point 160 (725 RPM in the exemplary embodiment) plus a TOUCH POINT OFFSET MEAN which is defined below.

The engine speed is moved toward the TARGET SPEED 168 at a controlled rate. The controlled rate decreases as the engine speed increases. The controlled rate at which the engine speed is first moved to an Intermediate Speed less than the CLUTCH TARGET SPEED equals a NORMAL FAST RAMP FROM IDLE, or 300 RPM/sec. The controlled rate of increase between the intermediate speed and the CLUTCH TARGET SPEED 168 drops to a NORMAL CONTROLLED RAMP, or 200 RPM/sec in the preferred embodiment. The controlled ramping-up continues until the CLUTCH TARGET SPEED is reached, so long as the engine speed follows the ramp within a range of, in the exemplary embodiment, of (25 RPM+(Throttle Pedal Position(%)) RPM). It should be appreciated that units are mixed in the preceding range calculation, but the equation has shown by testing to provide an appropriate engine speed operating range when attempting to reach the CLUTCH TARGET SPEED 168.

If the Pedal Position is greater than, in the preferred embodiment, 90%, and the engine is below the Intermediate Speed, then the CLUTCH DESIRED ENGINE SPEED is ramped-up at a RIDE-THROUGH-DETENT FAST RAMP RATE which in an exemplary embodiment is 300 RPM/sec. When the engine is above the Intermediate Speed, the ramp rate is decreased to a RIDE-THROUGH-DETENT CONTROLLED RAMP of, in an exemplary embodiment, 250 RPM/sec. The engine speed ramp-up continues, so long as the engine speed stays within the range equal to (25 RPM+ (Throttle Pedal Position(%)) RPM). The RIDE-THROUGH-DETENT RAMP calibrations provide a somewhat quicker vehicle launch when a heavy throttle is applied.

Once the CLUTCH DESIRED ENGINE SPEED has been ramped up to the CLUTCH TARGET SPEED 168, it stays at that value until either the throttle setting is changed or the clutch becomes engaged. An exception is if THE RIDE-THROUGH-DETENT is exceeded. That is, if the throttle pedal position is greater than 90%, and CLUTCH DESIRED ENGINE SPEED is near the CLUTCH TARGET SPEED for a predetermined period (1.5 seconds in an exemplary embodiment) then, the CLUTCH DESIRED ENGINE SPEED is increased at a slower rate of HIGH RES (Resistance to Launch) RAMP UP RATE, equal to 50 RPM/Sec in the preferred embodiment, until the throttle is released, reduced or the clutch becomes engaged. Examples of high resistance to launch conditions which might induce such circumstances include trying to start in mud, and trying to start on a steep grade.

If the CLUTCH TARGET SPEED 168 is lower than either the current engine speed or the current CLUTCH DESIRED ENGINE SPEED (such as when the throttle setting is reduced after the CLUTCH DESIRED ENGINE SPEED has ramped up to or near the CLUTCH TARGET SPEED), THE CLUTCH DESIRED ENGINE SPEED is immediately lowered to the new CLUTCH TARGET SPEED 168 without a ramped delay.

Due to the mechanical nature of the components of the disclosed centrifugal clutch 20, the relationship between clutch torque capacity and engine speed may vary due to several factors. These include spring fatigue, clutch friction material wear, dirt and contamination causing friction, and perhaps other factors. Such factors may cause the torque versus speed curve to shift up or down in speed. While this may not cause the clutch to malfunction, its performance, throttle response, etc. may vary, causing changes in the operational characteristics. In extreme circumstances, starts-from-rest may be rough, or unusually high throttle amounts may be needed to achieve the starting performance that should result from a light throttle. Therefore, a simple adaptive routine is used to adjust the Clutch Target Speed versus throttle curve up or down to restore the performance to optimum.

For a given configuration of the centrifugal clutch 20 there is a particular Clutch Target Speed Versus Throttle Position curve, as shown in FIG. 3, for which the clutch will perform in the optimum manner. The optimum curve is one which the clutch 20 just starts producing torque at a speed slightly above (15 to 30 RPM in an exemplary embodiment) Light Throttle Lo Speed 160. Also, the slopes of the Light and Heavy Throttle Speed Limit curves 156 and 158 are such that a wide range of starting performance can be achieved across the throttle range while providing good throttle response.

While the determination of the Light Throttle Lo Speed point 160 is objective, determining the slopes of the two curves 156 and 158 and the placement of the Heavy Throttle Lo Speed point 164 is more subjective. Those values are therefore determined more empirically. However, a good objective guide that can be used is that the Heavy Throttle Hi Speed point 166 should be placed at an engine speed that results in approximately 25 to 30% of clutch peak torque capacity.

The Clutch Target Speed curve 168 of FIG. 3 was derived empirically in the manner of the previous paragraph. Once the curve 168 is determined and programmed into calibration, it can be used for any application for a given configuration of centrifugal clutch. The following adaptive routine shall be used to adjust or shift the curve up and down to adapt for wear, friction, etc.

To "adapt" or adjust the curve 168 for a particular centrifugal clutch, a clutch "touch point" speed must be determined. A Touch Point Speed for a centrifugal clutch is the engine speed at which the clutch just starts developing torque. The Touch Point Speed is determined by slowly increasing the engine speed from idle and recording the point at which the input shaft of the transmission just starts to spin. The Touch Point Speed can be determined during two portions of the centrifugal clutch operation. The first potential opportunity to establish the Touch Point Speed is when attempting to engage a gear when the vehicle is stopped. If the Anti-Butt Routine is invoked, the engine speed at which the input shaft speed exceeds 25 RPM is recorded as the Touch Point Speed. The second opportunity is when an Input Shaft Speed over 100 RPM has not been detected on power up. In such a circumstance, the Anti-Butt Routine is also invoked.

A Touch Point Offset equal to the recorded Touch Point Speed less a Reference Touch Point Speed (equal in the exemplary embodiment to 765 RPM) is calculated. The Reference Touch Point Speed is defined as the speed on the Light Throttle Target Line 156 that corresponds to a Reference Touch Point Percent Throttle, which, in the exemplary embodiment, is 15%. Touch Point Offset is limited at a maximum to a Touch Point Offset Max, and to a minimum of Touch Point Offset Min, 100 RPM and −100 RPM respectively in the exemplary embodiment. A Touch Point Offset Mean is calculated from the Touch Point Offset Max by averaging it with an average of earlier measurements of the Touch Point Offset. The Touch Point Offset Mean is added to the Target Speed Limit to move the line up or down as may be the case.

Upon Power-Down, the Touch Point Offset Mean is stored in the ECU 50. If the store value is corrupted or the ECU is new or newly programmed, the clutch algorithm will be forced to run upon power-up and the initially calculated value of Touch Point Offset will immediately used as the Touch Point Offset Mean.

Accordingly, it may be seen that a new and improved control method/system for a transmission system and centrifugal master friction clutch is provided.

Although the present invention has been described with a certain degree of particularity, it is understood that the description of the exemplary embodiment is by way of example only and that numerous changes to form and detail are possible without departing from the spirit and scope of the invention as hereinafter claimed. For example, the described clutch could be used in other applications besides a vehicle drivetrain. Further, the clutch could be used to connect driving and driven devices distinct from those specified herein.

I claim:

1. A method for controlling a vehicular automated transmission system to overcome a tooth butt condition, the automated transmission system including an internal combustion engine having an engine output member, a multiple speed change gear transmission having an input shaft, a shift actuator connected to the transmission for selectively engaging a desired transmission gear ratio and responsive to a system controller, a centrifugal friction clutch for drivingly connecting said engine output member to said input shaft, a throttle responsive to manually requesting of a degree of engine fueling, the system controller receiving input signals including two or more of signals of (i) engine speed, (ii) throttle position, (iii) engaged transmission ratio, (iv) input shaft speed, (v) vehicle speed, (vi) a position of jaw clutch members, and (vii) shift signals indicative of attempting to shift the transmission into gear, and the system controller having at least one mode of operation for selectively controlling engine fueling to control at least one of engine speed and engine torque, and the system controller processing said signals according to logic rules to issue command output signals to system actuators including at least said engine controller, said method comprising the steps of:

a) sensing certain tooth butt constituent conditions;

b) establishing the occurrence of the tooth butt condition based on the tooth butt constituent conditions;

c) transferring engine control to an anti-butt routine within the system controller with the occurrence of the tooth butt condition;

d) at least periodically checking the tooth butt constituent conditions during the execution of the anti-butt routine and exiting the anti-butt routine if any of the tooth butt constituent conditions are not satisfied;

e) automatically increasing the engine speed at a first ramp-rate under control of the anti-butt routine until one of a first target engine speed and a first target elapsed ramp-up time is reached;

f) automatically decreasing the engine speed to an idle speed upon reaching one of the first target engine speed and the first target elapsed ramp-up time under control of the anti-butt routine;

g) if the transmission remains in a tooth butt condition after reducing the engine speed to idle, again automatically increasing the engine speed under control of the anti-butt routine at a second ramp-rate up to a maximum established by one of a second target engine speed and a second target elapsed ramp-up time;

h) automatically decreasing the engine speed to an idle speed upon reaching one of the second target engine speed and the second target elapsed ramp-up time under control of the anti-butt routine; and i) releasing control of the engine speed by the anti-butt routine.

2. The method of claim 1 wherein the certain tooth butt constituent conditions include:

the shift actuator is shifting into a desired gear position;

the desired gear position is not Neutral;

gear engagement is not indicated; and the vehicle is not moving.

3. The method of claim 1 wherein the second target engine speed and the second target elapsed ramp-up time are greater than the first target engine speed and the first target elapsed ramp-up time.

4. The method of claim 1 wherein, after a predetermined target engine speed is reached, the ramp-rate at which the engine speed is being automatically increased is decreased to a third rate less than the first rate.

5. The method of claim 4 wherein, after the predetermined target engine speed is reached, the ramp-rate at which the engine speed is being automatically increased is decreased to a fourth rate less than the second rate.

6. The method of claim 4 wherein the first ramp-rate equals approximately 300 RPM/SECOND.

7. The method of claim 6 wherein the third ramp-rate equals approximately 100 RPM/SECOND.

8. The method of claim 5 wherein the second target engine speed and the second target elapsed ramp-up time are greater than the first target engine speed and the first target elapsed ramp-up time.

9. The method of claim 5 wherein if the transmission remains in a tooth butt condition after reducing the engine speed to idle a second time, the engine speed is again automatically increased under control of the anti-butt routine at a fifth ramp rate up to a maximum established by one of a third target engine speed and a third target elapsed ramp-up time before releasing control of the engine speed.

10. The method of claim 9 wherein the third target engine speed and the third target elapsed ramp-up time are greater than the second target engine speed and the second target elapsed ramp-up time.

11. A method for controlling a vehicular automated transmission system to overcome a tooth butt condition, the automated transmission system including an internal combustion engine having an engine output member, a multiple speed change gear transmission having an input shaft, a centrifugal friction clutch for drivingly connecting said engine output member to said input shaft, a throttle responsive to manually requesting of a degree of engine fueling, a system controller receiving input signals including two or more of signals of (i) engine speed, (ii) throttle position, (iii) engaged transmission ratio, (iv) input shaft speed, (v) vehicle speed, (vi) a position of jaw clutch members, and (vii) shift signals indicative of attempting to shift the transmission into gear, and the system controller having at least one mode of operation for selectively controlling engine fueling to control at least one of engine speed and engine torque, and the system controller processing said signals according to logic rules to issue command output signals to system actuators including at least said engine controller, said method comprising the steps of:

(a) sensing certain tooth butt constituent conditions;
(b) establishing the occurrence of the tooth butt condition based on the tooth butt constituent conditions;
c) imposing automatic control of the engine by the controller with the occurrence of the tooth butt condition;
d) at least periodically checking the tooth butt constituent conditions after the occurrence of the tooth butt condition and ending automatic control of the engine by the controller if any of the tooth butt constituent conditions are not satisfied;
e) automatically increasing the engine speed at a first ramp-rate under control of the controller until one of a first target engine speed and a first target elapsed ramp-up time is reached;
f) automatically decreasing the engine speed to an idle speed upon reaching one of the first target engine speed and the first target elapsed ramp-up time under control of the controller;
g) if the transmission remains in a tooth butt condition after reducing the engine speed to idle, again automatically increasing the engine speed under control of the controller at a second ramp-rate up to a maximum established by one of a second target engine speed and a second target elapsed ramp-up time;
h) automatically decreasing the engine speed to an idle speed upon reaching one of the second target engine speed and the second target elapsed ramp-up time under control of the controller; and
i) releasing automatic control of the engine by the controller.

12. The method of claim 11 wherein the certain tooth butt constituent conditions include:
the shift actuator is shifting into a desired gear position;
the desired gear position is not Neutral;
gear engagement is not indicated; and
the vehicle is not moving.

13. The method of claim 11 wherein the second target engine speed and the second target elapsed ramp-up time are greater than the first target engine speed and the first target elapsed ramp-up time.

14. The method of claim 11 wherein, after a predetermined target engine speed is reached, the ramp-rate at which the engine speed is being automatically increased is decreased to a third rate less than the first rate.

15. The method of claim 14 wherein, after the predetermined target engine speed is reached, the ramp-rate at which the engine speed is being automatically increased is decreased to a fourth rate less than the second rate.

16. The method of claim 14 wherein the first ramp-rate equals approximately 300 RPM/SECOND.

17. The method of claim 16 wherein the third ramp-rate equals approximately 100 RPM/SECOND.

18. The method of claim 15 wherein the second target engine speed and the second target elapsed ramp-up time are greater than the first target engine speed and the first target elapsed ramp-up time.

19. The method of claim 15 wherein if the transmission remains in a tooth butt condition after reducing the engine speed to idle a second time, the engine speed is again automatically increased under control of the controller at a fifth ramp rate up to a maximum established by one of a third target engine speed and a third target elapsed ramp-up time before releasing control of the engine speed.

20. The method of claim 19 wherein the third target engine speed and the third target elapsed ramp-up time are greater than the second target engine speed and the second target elapsed ramp-up time.

21. A control system for controlling a vehicular automated transmission system to overcome a tooth butt condition, the automated transmission system including an internal combustion engine having an engine output member, a multiple speed change gear transmission having an input shaft, a centrifugal friction clutch for drivingly connecting said engine output member to said input shaft, a throttle responsive to manually requesting of a degree of engine fueling, a system controller receiving input signals including two or more of signals of (i) engine speed, (ii) throttle position, (iii) engaged transmission ratio, (iv) input shaft speed, (v) vehicle speed, (vi) a position of jaw clutch members, and (vii) shift signals indicative of attempting to shift the transmission into gear, and the system controller having at least one mode of operation for selectively controlling engine fueling to control at least one of engine speed and engine torque, and the system controller processing said signals according to logic rules to issue command output signals to system actuators including at least said engine controller, said control system comprising logic rules effective for:
   (a) sensing certain tooth butt constituent conditions;
   (b) establishing the occurrence of the tooth butt condition based on the tooth butt constituent conditions;
   c) imposing automatic control of the engine by the controller with the occurrence of the tooth butt condition;
   d) at least periodically checking the tooth butt constituent conditions after the occurrence of the tooth butt condition and ending automatic control of the engine by the controller if any of the tooth butt constituent conditions are not satisfied;
   e) automatically increasing the engine speed at a first ramp-rate under control of the controller until one of a first target engine speed and a first target elapsed ramp-up time is reached;
   f) automatically decreasing the engine speed to an idle speed upon reaching one of the first target engine speed and the first target elapsed ramp-up time under control of the controller;
   g) if the transmission remains in a tooth butt condition after reducing the engine speed to idle, again automatically increasing the engine speed under control of the controller at a second ramp-rate up to a maximum established by one of a second target engine speed and a second target elapsed ramp-up time;
   h) automatically decreasing the engine speed to an idle speed upon reaching one of the second target engine speed and the second target elapsed ramp-up time under control of the controller;
   i) releasing automatic control of the engine by the controller.

22. The method of claim 21 wherein the certain tooth butt constituent conditions include:
the shift actuator is shifting into a desired gear position;
the desired gear position is not Neutral;
gear engagement is not indicated; and
the vehicle is not moving.

23. The method of claim 21 wherein the second target engine speed and the second target elapsed ramp-up time are greater than the first target engine speed and the first target elapsed ramp-up time.

24. The method of claim 21 wherein, after a predetermined target engine speed is reached, the ramp-rate at which the engine speed is being automatically increased is decreased to a third rate less than the first rate.

25. The method of claim 24 wherein, after the predetermined target engine, speed is reached, the ramp-rate at which the engine speed is being automatically increased is decreased to a fourth rate less than the second rate.

26. The method of claim 24 wherein the first ramp-rate equals approximately 300 RPM/SECOND.

27. The method of claim 26 wherein the third ramp-rate equals approximately 100 RPM/SECOND.

28. The method of claim 25 wherein the second target engine speed and the second target elapsed ramp-up time are greater than the first target engine speed and the first target elapsed ramp-up time.

29. The method of claim 25 wherein if the transmission remains in a tooth butt condition after reducing the engine speed to idle a second time, the engine speed is again automatically increased under control of the controller at a fifth ramp rate up to a maximum established by one of a third target engine speed and a third target elapsed ramp-up time before releasing control of the engine speed.

30. The method of claim 29 wherein the third target engine speed and the third target elapsed ramp-up time are greater than the second target engine speed and the second target elapsed ramp-up time.

* * * * *